Dec. 2, 1941.   B. F. PARR   2,264,710
ELECTRIC APPLIANCE HANDLE
Filed July 13, 1939   2 Sheets-Sheet 1
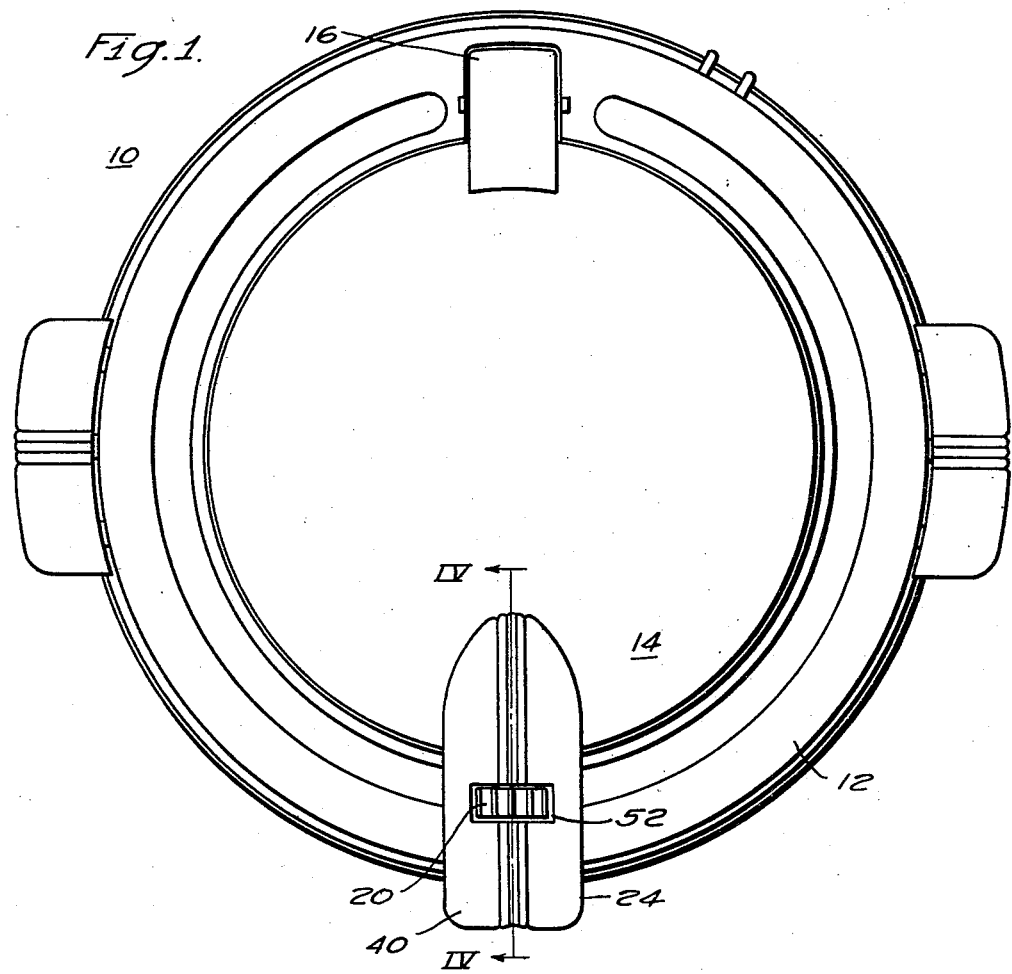
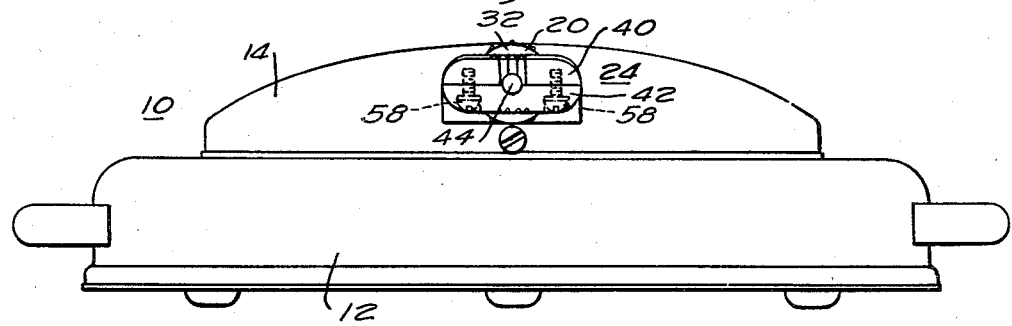
WITNESSES:
INVENTOR
Bernard F. Parr.
BY
ATTORNEY Dec. 2, 1941.    B. F. PARR    2,264,710
ELECTRIC APPLIANCE HANDLE
Filed July 13, 1939    2 Sheets-Sheet 2
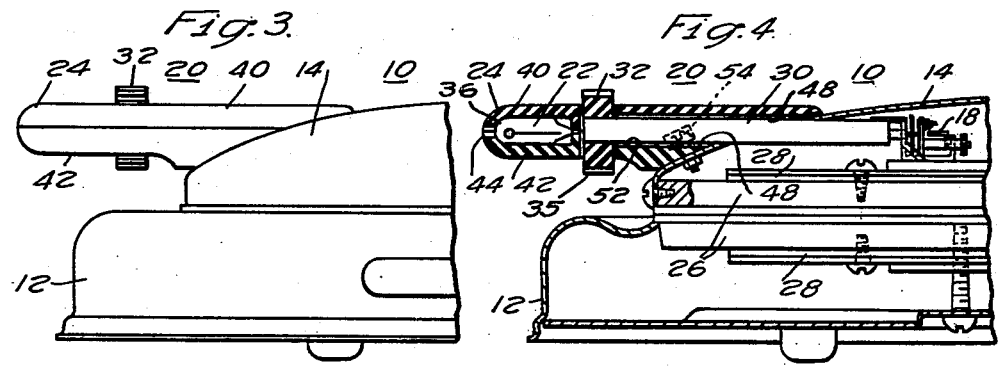
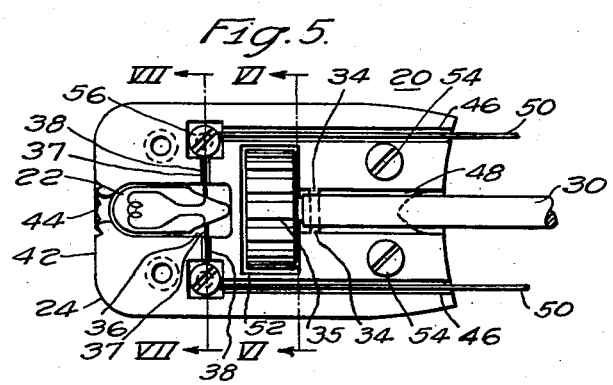
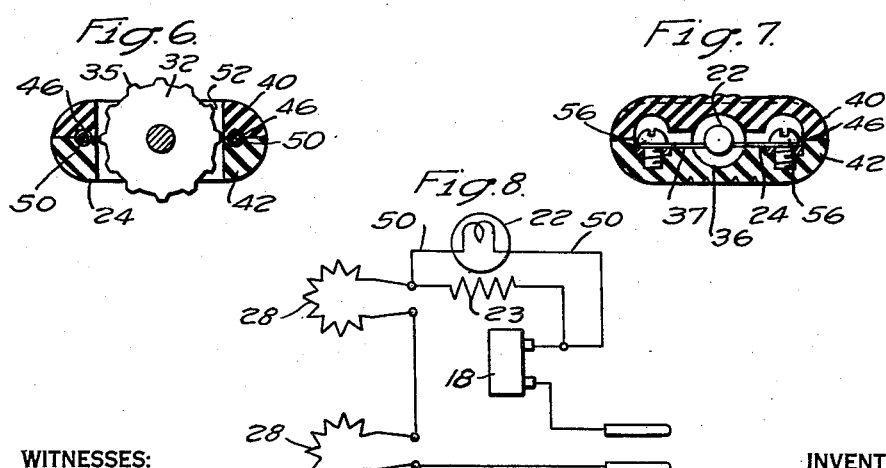
WITNESSES:
E. A. McCloskey
K. E. Hepler
INVENTOR
Bernard F. Parr.
BY
W. R. Coley
ATTORNEY Patented Dec. 2, 1941

2,264,710

UNITED STATES PATENT OFFICE 2,264,710

ELECTRIC APPLIANCE HANDLE

Bernard F. Parr, Mansfield, Ohio, assignor to Westinghouse Electric & Manufacturing Company, East Pittsburgh, Pa., a corporation of Pennsylvania Application July 13, 1939, Serial No. 284,148

4 Claims. (Cl. 219—19)

My invention relates to electric appliances, and more particularly to handles for waffle irons, sandwich grills or the like.

The modern trend in styling of appliances such as waffle irons and sandwich grills indicates the need of a symmetrical or even balance of the exterior thereof. The location of the thermostatic controlling members and signal lights upon the main surface of the appliance does not permit such structures to follow the modern design tendencies, but on the contrary, have a definite retarding action thereon.

It is, therefore, an object of my invention to provide an electric appliance having the thermostatic controlling means and signal light located within the appliance handle, permitting such appliance to be shaped in any desired manner.

Another object of my invention is to provide an electric appliance handle which is adapted to support the appliance thermostat control and signal light.

A further object of my invention is to provide a handle having a plurality of slots therein for supporting a signal light and a thermostat control shaft.

Still another object of my invention is to provide a rugged appliance handle having at least two portions with cooperating notches therein for retaining a thermostatic adjusting and indicating mechanism, and a signalling device for indicating when the appliance is energized.

Other objects of my invention will either be pointed out specifically in the course of the following description of a device embodying my invention, or will be apparent from such description.

In the accompanying drawings,

Figures 1 and 2 are a top plan view and a side elevational view, respectively, of an appliance embodying my invention;

Fig. 3 is a fragmentary side elevational view illustrating the appliance handle embodying my invention;

Fig. 4 is a sectional view taken along the line IV—IV of Fig. 1;

Fig. 5 is a top plan view of the lower portion of the handle embodying my invention;

Figs. 6 and 7 are sectional views taken along the lines VI—VI and VII—VII, respectively, of Fig. 4; and Fig. 8 is a wiring diagram of the appliance embodying my invention.

Referring to the accompanying drawings, in which like reference characters indicate like parts in the several figures, I show an electric cooking appliance or waffle iron 10 having a base portion 12 and a hingeable top portion 14 joined by a hinge structure 16, a thermostat 18 located within the top portion 14, thermostatic control means 20 operatively associated with the thermostat, a signal light 22 associated with the appliance 10 and thermostat 18 to indicate when the appliance is energized, and a handle 24 adapted to be rigidly attached to the hingeable top portion 14 and to receive or house the control means 20 and signal light 22.

The heating appliance 10 including the base portion 12, integral top portion 14 and hinge 16 illustrated herein, is more fully described in my copending application Serial No. 224,543, filed August 12, 1938, now Patent No. 2,193,601, and assigned to the assignee of the present invention which, as noted above, is directed to the handle assembly.

Suitable heating plates or grids 26 are rigidly attached to the base portion 12 and top portion 14, and have heating elements 28 associated therewith in a well known manner. In addition, the thermostat 18, which may be of any desired type, is attached to the upper heating plate 26 so as to be thermally associated therewith. However, the thermostat 18 is preferably of the type described and claimed in a copending application of E. K. Clark, Serial No. 293,681, filed Sept. 7, 1939, now Patent No. 2,228,073, and assigned to Westinghouse Electric & Manufacturing Company.

The thermostat 18 is selectively adjusted by means of the thermostatic control device 20 as hereinafter described. The thermostatic control device 20 comprises a horizontally disposed shaft 30 and a knob or disc 32 located at the free or outer end thereof. The shaft 30 is adapted to cooperate with the thermostat 18 at one end and to pass outwardly through the hingeable top portion 14 and to be journalled within the handle 24 by means of a bearing 34.

The disc or knob 32 is rigidly attached to the outer or free end of the shaft 30 and is accessibly located within an aperture 52 extending through the handle 24, whereby an operator may readily rotate the shaft 30 and adjust the thermostat 18. The disc or knob 32 has a plurality of ridges 35 located thereabout to facilitate an operator in rotating such disc. In addition, numbers or indicating characters representing various degrees of heat may be marked upon the disc 32 to permit an operator to know the exact position of the thermostat 18 and to permit such operator to select the desired operating temperature of the plates or grids 26.

The signal light 22 is, in this instance, any well-known miniature type of lamp which is void of a base. The baseless lamp 22 is located within a hollow 36 in the handle 24 and has the inleads 37 therefrom positioned within suitable transverse notches 38 in the handle 24. It, therefore, follows that the location of lamp 22 within the opening 36 and the cooperation of lamp inleads 37 within notches 38 fix the lamp's position and eliminate the need of a lamp base. The lamp 22 is electrically connected to the heating elements 28 of grids 26 by means of the lamp inleads 37 in a well-known manner, whereby the lamp 22 is energized when the heating elements 28 are energized. The lamp 22 with a suitable resistance 23 is connected in series with the heating elements 28 and thermostat 18 (see Fig. 8).

The handle 24 comprises an upper and a lower portion 40 and 42, respectively, which have one end thereof curved so as to be complementary to the surface of the top portion 14 of the waffle iron 10, as shown in Fig. 3, whereby the handle 24 will fit tightly against such top portion. The free end of the handle 24 is rounded and has an aperture 44 located therein to permit the light emitted from the lamp 22 to pass therethrough as an indicating means. A plurality of longitudinally extending notches 46 and a semi-circular notch 48 are located within the contiguous surfaces of the portions 40 and 42 of the handle 24. The notches 46 are adapted to receive leads 50 which connect the lamp 22 to the heating elements 28 while notch 48 affords passage for the shaft 30 of the thermostat control means 20 to pass therethrough. The handle 24 is in this instance formed of a phenolic resinous composition, which has suitable non-heat conducting properties. However, it is to be understood that such handle may be formed from any other suitable material.

A transversely extending aperture 52 is formed in the handle 24 substantially coaxial with the circular notch 48. The aperture 52 is adapted to receive the disc or knob 32 of the thermostatic control means 20 and to permit such disc or knob to protrude from the handle 24 on both sides, whereby an operator may readily rotate such disc.

When assembling the handle 24 with the appliance 10, suitable screws 54 are passed through the lower portion 42 of handle 24 and through the top portion 14 so as to rigidly attach such lower portion 42 to the top portion of the appliance 10. The thermostatic control means including the shaft 30 and the disc 32 are then passed through the top portion 14 and placed within the lower portion 42 of handle 24, so as to be journalled within the handle 24 and to be operatively associated with the thermostat 18. The lamp 22 is positioned within aperture 36, whereby the inleads 37 therefrom are positioned within the short transversely extending notches 38 and rigidly attached to set screws 56. The leads 50 may then be rigidly attached to set screws 56 so as to electrically connect the lamp 22 to the heating element 28.

The top portion 40 of handle 24 is then positioned upon and rigidly attached to the lower portion 42 by means of screws 58, see Fig. 2. The disc or knob 32 transversely protrudes from the handle 24, permitting an operator to selectively rotate shaft 30 and adjust the thermostat 18 to any predetermined value. The lamp 22 then being electrically associated with the thermostat and heating elements, is adapted to indicate at what times the heating elements 28 are energized.

It is, therefore, obvious that I have provided an appliance handle having at least two portions with cooperative notches within the contiguous surfaces thereof which retain a thermostat adjusting and indicating mechanism and a signalling device or lamp which indicates when the appliance is energized.

Various modifications may be made in the device embodying my invention without departing from the spirit and scope thereof, and I desire, therefore, that only such limitations shall be placed thereon as are imposed by the prior art and the appended claims.

I claim as my invention:

1. A handle for a heating appliance having a thermostatic adjusting means for the heater of said appliance operably positioned therein and a signalling means electrically associated therewith, said handle including a plurality of contiguous complementary body portions forming a hollow body and having a transverse aperture therethrough, said adjusting means and said signalling means being supported and partially enclosed within said body and said adjusting means having an exposed portion in said aperture for manual operation.

2. A handle for a heating appliance stationarily fastened thereto and having a movable thermostatic adjusting means for the heater of said appliance operably positioned therein and a signalling means electrically associated therewith, said handle including a plurality of contiguous complementary body portions forming a hollow body and having a transverse aperture therethrough, said adjusting means and said signalling means being partially enclosed by said body portions and said adjusting means being movably supported in said body portions and having an exposed portion in said aperture for manual operation.

3. A handle for a heating appliance having a thermostatic adjusting means for the heater of said appliance operably positioned therein and a signalling lamp electrically associated therewith, said handle including a plurality of contiguously operating body portions having longitudinally extending oppositely disposed recesses located within the confronting surfaces of said body portions and a transversely extending aperture through both body portions, said adjusting means and signalling lamp being supported and partly enclosed by said recesses, and means disposed within the aperture for manipulating said adjusting means.

4. A handle for a heating appliance stationarily fastened thereto and having a movable thermostatic adjusting means for the heater of said appliance operably positioned therein and a signalling lamp electrically associated therewith, said handle including a plurality of contiguously disposed body portions having longitudinally extending oppositely disposed recesses located within the confronting surfaces of said body portions and a transversely extending aperture through both body portions, said adjusting means and signalling lamp being supported and partly enclosed by said recesses, and means disposed within the aperture for manipulating said adjusting means.

BERNARD F. PARR.